United States Patent
Carter et al.

(10) Patent No.: US 8,744,452 B2
(45) Date of Patent: Jun. 3, 2014

(54) RECEIVING SIGNALS FROM SURROUNDING BASESTATIONS

(75) Inventors: Alan Carter, Swindon (GB); Stephen Whittaker, Newbury (GB); Aminu Wada Maida, Swindon (GB)

(73) Assignee: Ubiquisys Limited, Swindon (GB)

( * ) Notice: Subject to any disclaimer, the term of this patent is extended or adjusted under 35 U.S.C. 154(b) by 763 days.

(21) Appl. No.: 11/801,423

(22) Filed: May 8, 2007

(65) Prior Publication Data

US 2008/0188266 A1 Aug. 7, 2008

(30) Foreign Application Priority Data

Feb. 2, 2007 (GB) .................................. 0702093.6

(51) Int. Cl.
*H04W 36/00* (2009.01)
(52) U.S. Cl.
USPC .......................................... 455/444; 455/443
(58) Field of Classification Search
CPC .................................................. H04W 84/045
USPC ......... 455/561, 404.2, 448, 456.5, 41.1, 41.2, 455/515, 444
See application file for complete search history.

(56) References Cited

U.S. PATENT DOCUMENTS

| | | | |
|---|---|---|---|
| 5,438,608 A | 8/1995 | Kojima | |
| 5,448,762 A * | 9/1995 | Ward | 455/67.11 |
| 5,551,064 A | 8/1996 | Nobbe et al. | |
| 5,778,322 A | 7/1998 | Rydbeck | |
| 5,794,157 A | 8/1998 | Haartsen | |
| 5,884,145 A | 3/1999 | Haartsen | |
| 5,915,219 A | 6/1999 | Pöyhönen | |
| 6,014,563 A | 1/2000 | Szabo | |
| 6,052,595 A | 4/2000 | Schellinger et al. | |
| 6,141,565 A | 10/2000 | Feuerstein | |
| 6,201,972 B1 | 3/2001 | Hamabe | |
| 6,236,859 B1 | 5/2001 | Morper | |
| 6,311,059 B1 | 10/2001 | Walton | |
| 6,314,294 B1 | 11/2001 | Benveniste | |
| 6,351,638 B1 | 2/2002 | Robinson | |
| 6,377,803 B1 * | 4/2002 | Ruohonen | 455/434 |
| 6,421,328 B1 | 7/2002 | Larribeau et al. | |
| 6,473,413 B1 | 10/2002 | Chiou et al. | |

(Continued)

FOREIGN PATENT DOCUMENTS

| | | |
|---|---|---|
| CN | 14336454 A | 7/2003 |
| CN | 1674689 A | 9/2005 |

(Continued)

OTHER PUBLICATIONS

PCT International Search Report dated Feb. 21, 2007 issued in WO2007/015066.

(Continued)

*Primary Examiner* — Huy C Ho
(74) *Attorney, Agent, or Firm* — Weaver Austin Villeneuve & Sampson LLP

(57) ABSTRACT

A basestation for a cellular communications network is intended to provide coverage over a small area, which may be within an area that already has cellular coverage from one or more existing basestations. The basestation is therefore able to detect signals transmitted from the other basestations, in order to make measurements of the radio environment. In particular, the basestation may be able to receive signals periodically on the system downlink frequencies.

10 Claims, 9 Drawing Sheets

(56) References Cited

U.S. PATENT DOCUMENTS

| | | | |
|---|---|---|---|
| 6,542,741 B2 | 4/2003 | Wallstedt et al. | |
| 6,615,035 B1 | 9/2003 | Lucidarme et al. | |
| 6,684,067 B2 | 1/2004 | Blanke et al. | |
| 6,729,929 B1* | 5/2004 | Sayers et al. | 455/446 |
| 6,751,207 B1 | 6/2004 | Lee et al. | |
| 6,856,612 B1 | 2/2005 | Bjelland et al. | |
| 6,901,061 B1 | 5/2005 | Joo et al. | |
| 6,925,074 B1 | 8/2005 | Vikberg et al. | |
| 6,944,426 B1 | 9/2005 | Esser et al. | |
| 6,970,680 B1* | 11/2005 | Tomoe | 455/63.3 |
| 7,113,782 B2 | 9/2006 | Lucidarme | |
| 7,248,886 B1 | 7/2007 | Ljungstroem et al. | |
| 7,266,393 B2 | 9/2007 | Latva-Aho et al. | |
| 7,356,145 B2 | 4/2008 | Ala-Laurila et al. | |
| 7,477,920 B2 | 1/2009 | Scheinert et al. | |
| 7,565,144 B2 | 7/2009 | Saifullah et al. | |
| 7,596,124 B2 | 9/2009 | Brenes et al. | |
| 7,606,190 B2 | 10/2009 | Markovic et al. | |
| 7,635,269 B2 | 12/2009 | Oda | |
| 2001/0044305 A1 | 11/2001 | Reddy et al. | |
| 2002/0089951 A1 | 7/2002 | Hyun et al. | |
| 2002/0118656 A1 | 8/2002 | Agrawal et al. | |
| 2002/0123348 A1 | 9/2002 | Willars et al. | |
| 2002/0131387 A1 | 9/2002 | Pitcher et al. | |
| 2002/0165000 A1 | 11/2002 | Fok | |
| 2002/0191557 A1 | 12/2002 | Chow et al. | |
| 2002/0191561 A1 | 12/2002 | Chen et al. | |
| 2003/0032451 A1 | 2/2003 | Hu | |
| 2003/0058818 A1 | 3/2003 | Wilkes et al. | |
| 2003/0095520 A1 | 5/2003 | Aalbers | |
| 2003/0119489 A1 | 6/2003 | Mohammed | |
| 2003/0147383 A1 | 8/2003 | Capers | |
| 2004/0017786 A1 | 1/2004 | Shively | |
| 2004/0081159 A1 | 4/2004 | Pan et al. | |
| 2004/0152482 A1* | 8/2004 | Raffel et al. | 455/522 |
| 2004/0166867 A1 | 8/2004 | Hawe | |
| 2004/0190477 A1 | 9/2004 | Olson et al. | |
| 2004/0204097 A1 | 10/2004 | Scheinert et al. | |
| 2004/0224684 A1 | 11/2004 | Dorsey et al. | |
| 2004/0240430 A1 | 12/2004 | Lin et al. | |
| 2005/0026655 A1 | 2/2005 | Giaimo et al. | |
| 2005/0032542 A1* | 2/2005 | Wilborn et al. | 455/525 |
| 2005/0037766 A1 | 2/2005 | Hans et al. | |
| 2005/0088999 A1 | 4/2005 | Waylett et al. | |
| 2005/0118993 A1 | 6/2005 | Roux et al. | |
| 2005/0122900 A1 | 6/2005 | Tuulos et al. | |
| 2005/0129058 A1 | 6/2005 | Casaccia et al. | |
| 2005/0130657 A1 | 6/2005 | Creamer et al. | |
| 2005/0148368 A1* | 7/2005 | Scheinert et al. | 455/561 |
| 2005/0153700 A1* | 7/2005 | Farnsworth et al. | 455/446 |
| 2005/0255879 A1 | 11/2005 | Shi et al. | |
| 2005/0265279 A1 | 12/2005 | Markovic et al. | |
| 2005/0271009 A1 | 12/2005 | Shirakabe et al. | |
| 2006/0052085 A1 | 3/2006 | Gregrio Rodriguez et al. | |
| 2006/0062237 A1 | 3/2006 | Kim | |
| 2006/0142032 A1* | 6/2006 | Derakhshan et al. | 455/509 |
| 2006/0172722 A1 | 8/2006 | Christensen et al. | |
| 2006/0172752 A1 | 8/2006 | Harris et al. | |
| 2006/0286984 A1 | 12/2006 | Bonner | |
| 2006/0293038 A1 | 12/2006 | Walter et al. | |
| 2007/0008885 A1 | 1/2007 | Bonner | |
| 2007/0213086 A1 | 9/2007 | Claussen et al. | |
| 2008/0102794 A1 | 5/2008 | Keevill et al. | |
| 2008/0108346 A1* | 5/2008 | Umatt et al. | 455/432.1 |
| 2008/0254833 A1 | 10/2008 | Keevill et al. | |
| 2008/0259886 A1 | 10/2008 | Svarre et al. | |
| 2009/0017864 A1 | 1/2009 | Keevill et al. | |
| 2010/0317405 A1 | 12/2010 | Keevill et al. | |
| 2013/0089055 A1 | 4/2013 | Keevill et al. | |

FOREIGN PATENT DOCUMENTS

| | | |
|---|---|---|
| DE | 19633925 | 3/1998 |
| EP | 0766427 | 4/1997 |
| EP | 0944274 A2 | 9/1999 |
| EP | 1 032 236 | 8/2000 |
| EP | 1 049 340 | 11/2000 |
| EP | 1104977 A1 | 6/2001 |
| EP | 1 267 524 | 12/2002 |
| EP | 1 286 561 | 2/2003 |
| EP | 1 351 530 | 10/2003 |
| EP | 1 519 613 | 3/2005 |
| EP | 1536659 A1 | 6/2005 |
| EP | 1587335 A1 | 10/2005 |
| EP | 1641302 A1 | 3/2006 |
| EP | 1 650 907 | 4/2006 |
| EP | 1 681 804 | 7/2006 |
| EP | 1 754 386 | 2/2007 |
| GB | 2321158 | 7/1998 |
| GB | 2355885 | 5/2001 |
| GB | 2419774 | 5/2006 |
| JP | A H08-023299 | 1/1996 |
| JP | H08-023299 | 1/1996 |
| JP | A H08-237728 | 9/1996 |
| JP | H08-237728 | 9/1996 |
| JP | 10-136442 | 5/1998 |
| JP | 2001197557 | 7/2001 |
| JP | 2002-538679 | 11/2002 |
| JP | 2002-359590 | 12/2002 |
| JP | A 2002-359590 | 12/2002 |
| JP | 2003274011 | 9/2003 |
| JP | 2004-522348 | 7/2004 |
| JP | 2005-184817 | 7/2005 |
| JP | 2009-500882 | 1/2009 |
| WO | WO 95/08902 | 3/1995 |
| WO | WO 97/50274 | 12/1997 |
| WO | 00/13377 | 3/2000 |
| WO | WO 00/28752 | 5/2000 |
| WO | WO 0056100 A | 9/2000 |
| WO | WO 00/74415 | 12/2000 |
| WO | WO 01/76276 | 10/2001 |
| WO | WO 01/78430 | 10/2001 |
| WO | WO 01/93617 | 12/2001 |
| WO | WO 02/054820 | 7/2002 |
| WO | WO 02/063900 | 8/2002 |
| WO | WO 02/073883 | 9/2002 |
| WO | WO 02/093811 | 11/2002 |
| WO | WO 03/010908 | 2/2003 |
| WO | WO 03/028344 | 4/2003 |
| WO | WO 03/032616 | 4/2003 |
| WO | WO 03/061177 | 7/2003 |
| WO | WO 03/084096 | 10/2003 |
| WO | WO 03/085992 | 10/2003 |
| WO | WO 03/090013 | 10/2003 |
| WO | WO 2004/017585 | 2/2004 |
| WO | WO 2004/040938 A1 | 5/2004 |
| WO | WO 2004/086788 | 10/2004 |
| WO | 2005/011134 | 2/2005 |
| WO | WO 2005/029889 | 3/2005 |
| WO | WO 2005/048577 | 5/2005 |
| WO | WO 2005/057968 | 6/2005 |
| WO | WO 2005/060292 | 6/2005 |
| WO | WO 2005/079087 | 8/2005 |
| WO | WO 2005/107195 | 11/2005 |
| WO | WO 2005/112410 | 11/2005 |
| WO | WO 2005/114918 | 12/2005 |
| WO | WO 2005/114920 | 12/2005 |
| WO | WO 2005/125233 | 12/2005 |
| WO | WO 2006/005999 | 1/2006 |
| WO | WO 2007/015066 | 2/2007 |

OTHER PUBLICATIONS

European Examination Report dated Sep. 12, 2008 issued in EP 06 765 153.9-2412.

UK Search Report dated Sep. 22, 2008 issued in GB0807815.6.

UMA Architecture (Stage 2) R1.0.4 (May 2, 2005).

Mouly, M. et al., "Mobility and Security Management," GSM System for Mobile Communications, Lassay-Les-Chateaux, Europe Media, FR, 1993, pp. 432-498.

International Search Report dated Jun. 19, 2008, for related PCT Application No. PCT/GB2008/000344.

(56) References Cited

OTHER PUBLICATIONS

United Kingdom Search Report dated Jun. 20, 2007, for related GB Application No. 0702093.6.
United Kingdom Search Report dated Sep. 11, 2007, for related GB Application No. 0702093.6.
International Search Report dated Nov. 7, 2008 from corresponding International Application No. PCT/GB2008/000344.
Extended European Search Report dated Nov. 4, 2011, EP Application No. 10184587.3.
Chinese Office Action dated Nov. 10, 2011, CN Application No. 200880010299.1.
Extended European Search Report dated Jan. 30, 2012, Application No. 11188896.2-1525.
Extended European Search Report dated Jan. 12, 2012, Application No. 11188897.0.
First Japanese Office Action dated May 21, 2012, Application No. 2009-547763.
U.S. Office Action dated Feb. 2, 2011, U.S. Appl. No. 12/862,523.
U.S. Office Action dated Sep. 7, 2011, U.S. Appl. No. 12/862,523.
U.S. Office Action dated Feb. 4, 2011, U.S. Appl. No. 12/872,970.
U.S. Office Action dated Sep. 8, 2011, U.S. Appl. No. 12/872,970.
CN Office Action dated Jan. 25, 2011, Application No. 200680036431.7.
EP Examination Report dated May 29, 2008 issued in EP 06 765 134.9-2412.
EP Examination Report dated Nov. 12, 2009 issued in EP 08 702 011.1-1525.
JP Office Action dated Oct. 1, 2010, issued in JP 2008-524575.
PCT International Search Report and Written Opinion dated Nov. 8, 2006 issued in PCT/GB2006/002820.
PCT International Search Report and Written Opinion dated Nov. 10, 2006 issued in PCT/GB2006/002838.
PCT International Search Report and Written Opinion dated Feb. 23, 2007 issued in PCT/GB2006/002819.
PCT International Search Report and Written Opinion dated Feb. 28, 2007 issued in PCT/GB2006/002824.
UK Search Report dated Jan. 5, 2006 issued in GB0515888.6.
UK Search Report dated Mar. 10, 2006 issued in GB0515888.6.
UK Examination Report dated Jul. 28, 2009 issued in GB0515888.6.
UK Examination Report dated Mar. 1, 2010 issued in GB0515888.6.
UK Search Report dated Jan. 31, 2007 issued in GB0625660.6.
UK Search Report dated Feb. 14, 2007 issued in GB0625662.2.
UK Search and Examination Report dated Mar. 1, 2010 issued in GB1001514.7.
UK Search and Examination Report dated Mar. 1, 2010 issued in GB1001515.4.
UK Search and Examination Report dated Jun. 3, 2010 issued in GB1001515.4.
UK Search and Examination Report dated Jun. 26, 2008 issued in GB0807816.4.
UK Search and Examination Report dated Jul. 2, 2008 issued in GB0807818.0.
UK Examination Report dated Jun. 17, 2008 issued in GB0807819.8.
UK Examination Report dated Mar. 26, 2009 issued in GB0807819.8.
UK Search Report dated Jan. 30, 2007 issued in GB0625661.4.
UK Search Report dated Feb. 13, 2007 issued in GB0625663.0.
UK Search and Examination Report dated Jul. 1, 2009 issued in GB0909125.7.
UK Search Report dated Sep. 14, 2006 issued in GB0610650.4.
UK Search Report dated Oct. 31, 2006 issued in GB0610650.4.
UK Search Report dated Jul. 7, 2008 issued in GB0610650.4.
ETSI Standards, "Digital Cellular Telecommunications System," ETSI TS 143 318, European Telecommunications Standards Institute, Sophia-Antipo, FR, vol. 3-G1, No. V6.2.0, Jun. 2005.
ETSI Standards, "Digital Cellular Telecommunications System," ETSI TS 123 122, European Telecommunications Standards Institute, Sophia-Antipo, FR, vol. 3-CN1, No. V6.5.0, Jun. 2005.

Johanson et al., "Mobile Advantage Wireless Office—A Digital Wireless Office System for TDMA/136 Networks," Ericsson Review, Ericsson, Stockholm, SE, vol. 1, 1999, pp. 20-27.
JP Office Action dated Sep. 16, 2011, JP Application No. 2008-524575.
U.S. Office Action dated Mar. 27, 2012, U.S. Appl. No. 12/862,523.
U.S. Office Action dated Apr. 16, 2012, U.S. Appl. No. 12/872,970.
JP Office Action dated Sep. 16, 2011, issued in JP 2008-524575.
EP Extended Search Report dated Feb. 3, 2012, EP10184563.
U.S. Final Office Action dated Jun. 12, 2012, U.S. Appl. No. 11/664,361.
U.S. Appl. No. 13/691,653, filed Nov. 30, 2012.
U.S. Office Action dated Sep. 14, 2011, U.S. Appl. No. 11/664,361.
U.S. Final Office Action dated Nov. 29, 2012, U.S. Appl. No. 12/862,523.
U.S. Office Action dated Dec. 5, 2012, U.S. Appl. No. 12/872,970.
CN Office Action dated Oct. 31, 2012 in CN Application No. 200880010299.1.
Second EP Examination Report dated Jul. 31, 2012 in EP Application No. 06765137.2.
JP Office Action dated Sep. 14, 2012 in JP Application No. JP 2008-524575.
JP Office Action dated Jan. 7, 2014 in JP Application No. 2013-004018.
U.S. Notice of Allowance dated Oct. 8, 2013, U.S. Appl. No. 11/664,361.
U.S. Notice of Allowance dated Nov. 15, 2013, U.S. Appl. No. 12/862,523.
U.S. Notice of Allowance dated Oct. 9, 2013, U.S. Appl. No. 12/872,970.
DE Patent Office Action DE 20 2006 020 957.3, Paper filed on Oct. 9, 2013 by Ubiquisys (in German and translation).
U.S. Office Action dated Jun. 27, 2013, U.S. Appl. No. 11/664,361.
Non-final Office Action dated Jun. 28, 2013, U.S. Appl. No. 12/862,523.
Notice of Allowance dated Jul. 1, 2013, U.S. Appl. No. 12/872,970.
CN Office Action dated Jun. 18, 2013, in Application No. 200880010299.1.
EP Search Report dated May 22, 2013 in EP Application No. 10184610.
JP Office Action dated Jul. 29, 2013 in Application No. 2012-061034.
ETSI TS 123 002 V3.4.0 (Jan. 2000), "Digital Cellular Telecommunications System (Phase 2+) (GSM); Universal Mobile Telecommunications System (UMTS); Network Architecture," 3GPP TS 23.002 version 3.4.0 Release 1999, pp. 16 & 17 and 22 (K15).
ETSI EN 302 405 V.7.1.1 (Aug. 2000), "Digital Cellular Telecommunications System (Phase 2+); GSM Cordless Telephony System (CTS), Phase 1; CTS Architecture Description; Stage 2," GSM 03.56 version 7.1.1 Release 1998 (K16a).
ETSI EN 302 404 V.8.0.1 (Sep. 2000), "Digital Cellular Telecommunications System (Phase 2+); GSM Cordless Telephony System (CTS), Phase 1; Lower Layers of the CTS Radio Interface; Stage 2," GSM 03.52 version 8.0.1 Release 1999 (K16b).
Bhatia et al., VOIP: An In-Depth Analysis, Cisco Press, Oct. 20, 2005, 15 pages.
UMA Architecture (Stage 2) R1.0.1 (Oct. 8, 2004), pp. 15-16 & 20.
Rosenberg et al., SIP: Session Initiation Protocol Memo, 2002.
Hoene et al., A Perceptual Quality Model for Adaptive VoIP Applications, Proceedings of International Symposium on Performance Evaluation of Computer and Telecommunication Systems (SPECTS'04), San Jose, CA, Jul. 2004 (11 pages).
Johanson et al., Mobile Advantage Wireless Office—A digital wireless office system for TDMA/136 networks, Ericsson Review No. 1, 1999, pp. 20-27.
DE Patent Office Action DE 20 2006 020 958.1, Reply to Cancellation Request filed by Respondent Ubiquisys Jul. 30, 2012 (in German and translation).
DE Patent Office Action DE 20 2006 020 957.3, Reply to Cancellation Request filed by Respondent Ubiquisys Jun. 21, 2012 (in German and translation).

(56) References Cited

OTHER PUBLICATIONS

DE Patent Office Action DE 20 2006 020 958.1, Reply filed by Respondent Ubiquisys Apr. 22, 2013 (in German and translation).
3 Way Networks 3 Way DBX Datasheet—3 Way Networks Announces First In-C Technology Product (DBX6750), Mar. 19, 2005 (K8a).
ETSI TR 125 933 V5.4.0 (Dec. 2003) (extract), University Mobile Telecommunications System (UMTS): IP transport in UTRAN (3GPP TR 25.933 version 5.4.0 Release 5), pp. 1-16 & 118, (K10).
ETSI TR 125 933 V5.4.0 (Dec. 2003) (extract), University Mobile Telecommunications System (UMTS): IP transport in UTRAN (3GPP TR 25.933 version 5.4.0 Release 5), p. 119, (K10a).
ETSI TS 125 414 V5.0.0 (Mar. 2002) (extract), University Mobile Telecommunications System (UMTS): UTRAN Iu Interface data transport and transport signalling (3GPP TS 25.414 version 5.0.0 Release 5), pp. 1-19, (K11).
ETSI TS 123 002 v3.4.0 (Dec. 2000) (extract), Digital cellular telecommunications system (Phase 2+) GSM; University Mobile Telecommunications System (UMTS); Network architecture (3GPP TS 23.002 version 3.4.0 Release 1000), pp. 1, 16-17 & 22, (K13).
Ip.access press release, "ip.access introduces GSM 900 picocellular basestation", Feb. 15, 2005 (K14).
Ip.access news release, "BT chooses ip.access for in-building GSM service offering", Nov. 18, 2004 (K14a).
Ip.access Datasheet—nanoBTS GPRS/GSM (2005) (K14b).

* cited by examiner

RECEIVING SIGNALS FROM SURROUNDING BASESTATIONS

This invention relates to a basestation for a cellular wireless communications network, and to methods of operation of such a basestation.

FIELD

In cellular wireless communications networks, basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells. In addition, basestations are now proposed that can be used to provide coverage over a very small area, for example within a single home or office building, and these are referred to as femtocell basestations.

BACKGROUND

In order to operate successfully within the radio environment, which will probably include at least one macrocell basestation, and may include a number of microcell and/or other femtocell basestations, the femtocell basestation needs to receive information about the surrounding basestations.

According to a first aspect of the present invention, there is provided basestation, for use in a cellular wireless communications network, the network having at least one downlink transmit frequency and at least one uplink transmit frequency, wherein the basestation is adapted periodically to receive signals from another basestation in said network on said downlink transmit frequency.

SUMMARY

According to a second aspect of the present invention, there is provided a method of operating a basestation in a cellular wireless communications network, the network having at least one downlink transmit frequency and at least one uplink transmit frequency, the method comprising configuring the basestation periodically to receive signals from another basestation in said network on said downlink transmit frequency.

DETAILED DESCRIPTION

Figure 1:
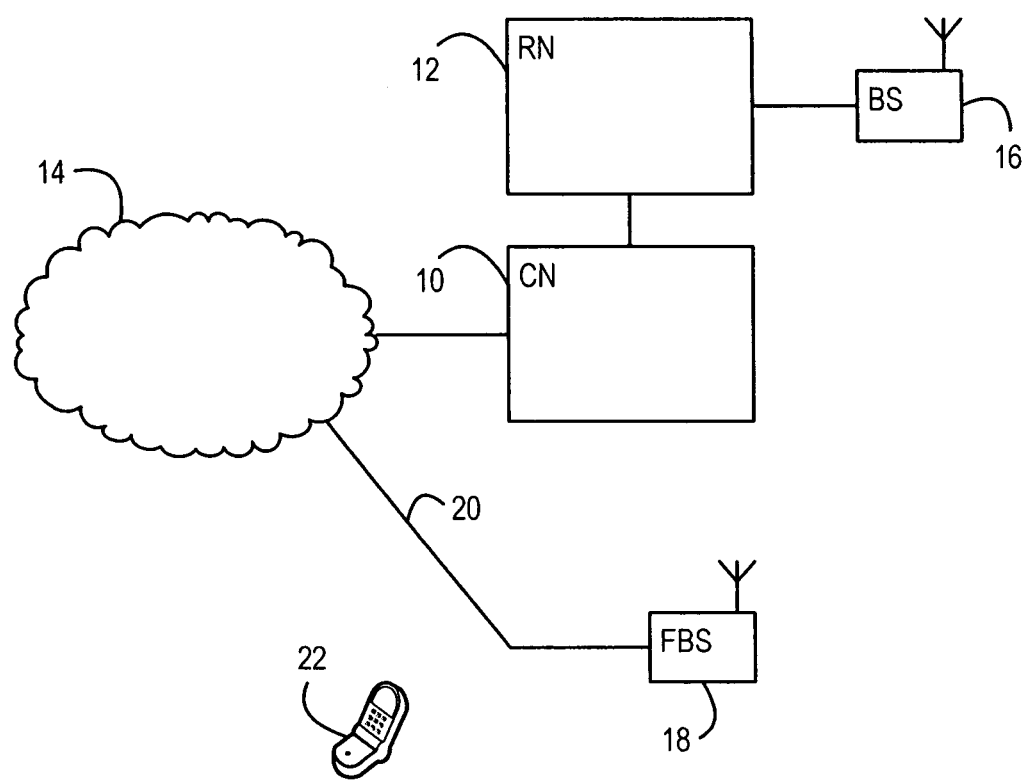
FIG. 1 is a block schematic diagram, illustrating a part of a cellular wireless communications network in accordance with an aspect of the present invention.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a basestation (BS) 16 connected thereto. As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells.

FIG. 1 also shows an additional basestation 18 that can be used to provide coverage over a very small area, for example within a single home or office building. This is referred to as a femtocell basestation (FBS). The femtocell basestation 18 is connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestation 16.

As mentioned above, the macrocell basestations provide coverage to the whole of the intended service area including the location of the femtocell basestation 18 and the location of the mobile phone 22 while it is in the coverage area of the femtocell basestation 18.

This property is used in aspects of the present invention, as will be described in more detail below.

Figure 2:
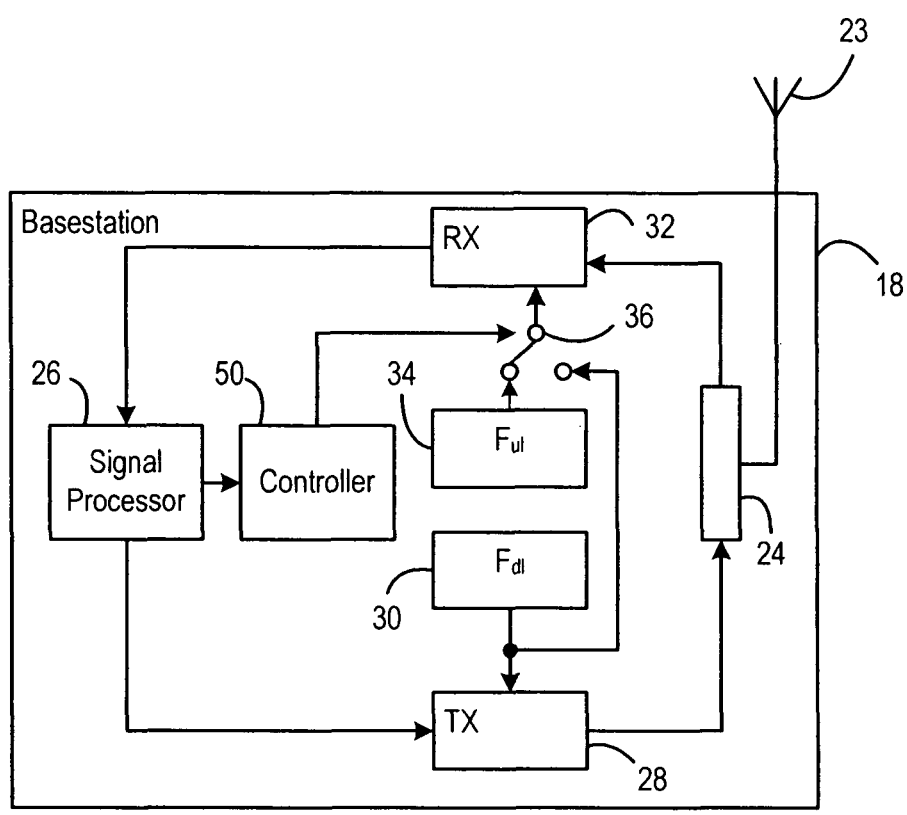
FIG. 2 is a block schematic diagram of a basestation in accordance with an aspect of the present invention.

FIG. 2 is a schematic diagram, illustrating in more detail the form of the basestation 18. The basestation has an antenna 23, connected to a duplexer 24. In the case where the cellular wireless network operates on the frequency division duplex principle, where each device can simultaneously transmit and receive radio frequency signals on a pair of frequencies having a known relationship, the duplexer is effectively a pair of matched filters that allow signals at the system downlink frequencies (that is, the transmit frequencies of the basestation 18) to be passed to the antenna 23, and allow signals at the system uplink frequencies (that is, the receive frequencies of the basestation 18) to be passed from the antenna 23.

The basestation 18 includes a signal processor 26. In the case of signals for transmission by the basestation 18, the signal processor 26 receives the digital signals, converts them to the required format based on the communications standard used by the basestation, and passes the signals to transmit RF circuitry (TX) 28. As is generally conventional, the transmit RF circuitry 28 converts the signals to analog form, and upconverts them to the required radio frequency using an oscillator signal at a downlink frequency $F_{dl}$. The oscillator signal is supplied by a first synthesizer 30. The RF signals can then be passed through the duplexer 24 to the antenna 22 for transmission.

In the case of signals transmitted by a mobile device having a connection with the basestation 18, the signals are received at the antenna 18, and passed through the duplexer 24 to receive RF circuitry (RX) 32. As is generally conventional, the receive RF circuitry 32 downconverts the signals from the relevant radio frequency using an oscillator signal at an uplink frequency $F_{ul}$, and converts them to digital form. The oscillator signal is supplied by a second synthesizer 34. The digital signals are then passed to the signal processor 26.

A switch 36 is also provided, which can alternatively allow the oscillator signal at the downlink frequency $F_{dl}$ to be applied to the receive RF circuitry (RX) 32, as will be described in more detail below.

The switch 36 operates under the control of a controller 38, which controls the operation of the basestation 18 generally.

In accordance with the present invention, the basestation 18 uses information transmitted by other network nodes, in order to optimize its own operation.

The system operated by the mobile network operator includes a management system (not shown in FIG. 1), which, amongst other things, provides the basestation 18 at power on with the required configuration information. For example, the management system provides the basestation 18 with a list of allowed scrambling codes, allowed UTRA Absolute Radio Frequency Channel Numbers (UARFCN), maximum downlink and uplink power levels, percentage CPICH level and percentage power allocation for different services etc. The basestation 18 measures key RF parameters from the neighbour cells, as described in more detail below, and selects the optimal carrier and scrambling code from this list. For example, it may make selections that will minimize RF interference between the basestation 18 and neighbour cells.

Figure 3:
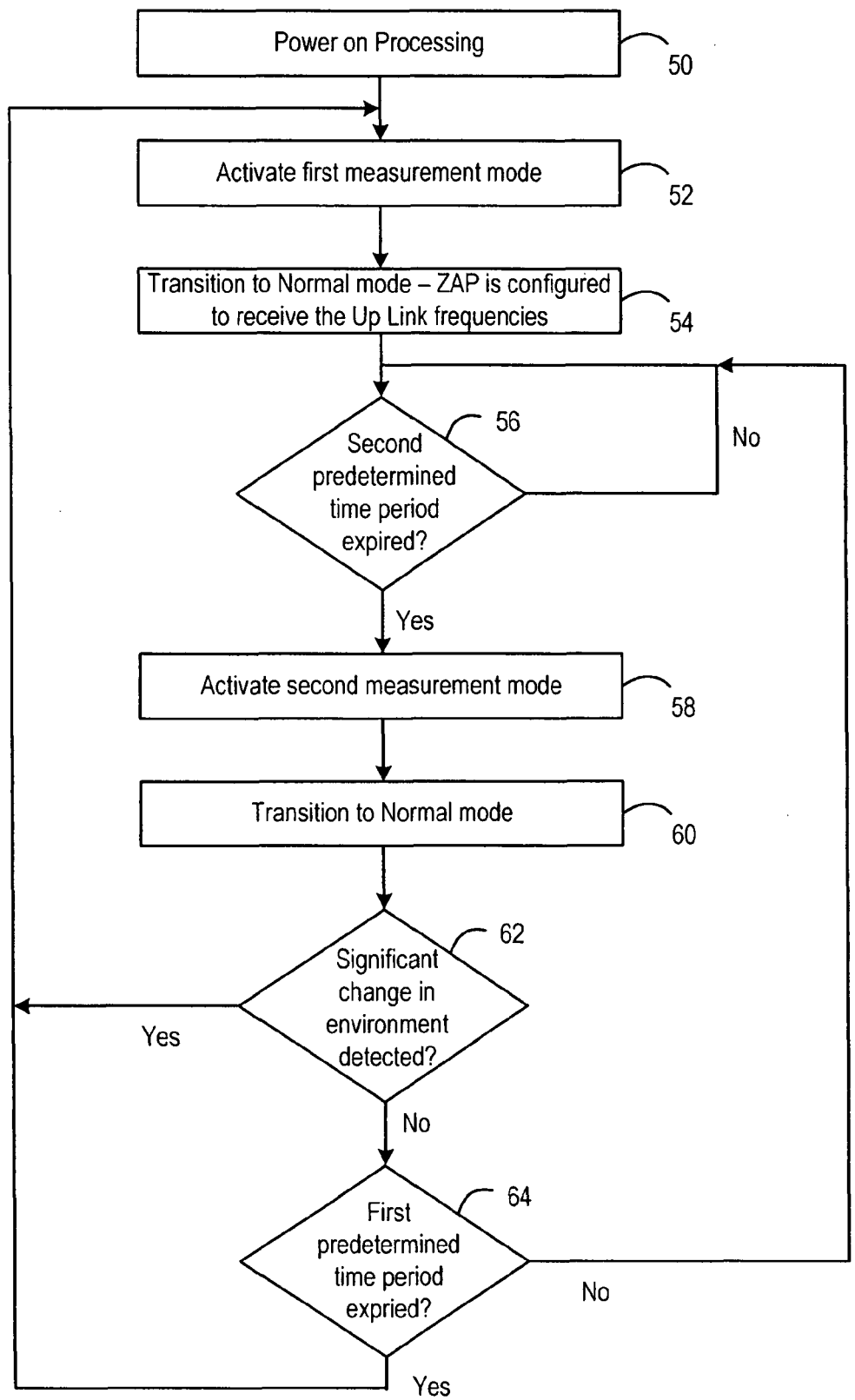
FIG. 3 is a flow chart, illustrating a first method in accordance with the invention.

FIG. 3 is a flow chart, illustrating how two types of measurements are made. At step 50, the device is first powered on, and power on processing is performed. Thereafter, the process passes to step 52, in which the first measurement mode (described in more detail below) is activated. Briefly, the basestation 18 is configured in such a way that it can receive signals on the system downlink frequencies. That is, it can receive signals transmitted from other basestations.

Once the required measurements in the first measurement mode have been made, the process passes to step 54, in which the normal operation mode is resumed. In this normal mode, the basestation 18 is configured in such a way that it can receive signals on the system uplink frequencies. That is, it can receive signals transmitted from mobile devices within its coverage area.

While the basestation 18 is in the normal operation mode, the process passes to step 56, in which it is determined whether a predetermined time period, associated with the second measurement mode, has expired. If not, the process returns to step 56 until this time period expires.

Then, in step 58, the second measurement mode (also described in more detail below) is activated. Again, the basestation 18 is configured in such a way that it can receive signals on the system downlink frequencies, and therefore can receive signals transmitted from other basestations.

Once the required measurements in the second measurement mode have been made, the process passes to step 60, in which the normal operation mode is resumed. As before, this means that the basestation 18 is configured in such a way that it can receive signals on the system uplink frequencies. That is, it can receive signals transmitted from mobile devices within its coverage area.

With the basestation 18 in its normal mode, in step 62, it attempts to detect any significant change in its radio environment. For example, changes in the network operator's cell planning may cause significant changes in the RF interference from neighbour cells. These may be detected by the basestation 18 itself. Alternatively, or additionally, a change may be signalled to the basestation 18 from the network.

If no change is detected, the process passes to step 64, in which it is determined whether a predetermined time period, associated with the first measurement mode, has expired. If not, the process returns to step 56 to resume testing whether the time period associated with the second measurement mode has expired.

If it is determined in step 64 that the predetermined time period associated with the first measurement mode has expired, or if it is determined in step 62 that there has been a significant change in the radio environment of the basestation 18, the process returns to step 52, in which the first measurement mode is again activated.

Thus, the first measurement mode is activated at power on and whenever an associated first time period has expired, which is preferably approximately once a day. This first measurement mode may also be activated externally if a major RF event has taken place.

The second measurement mode is activated whenever an associated second time period has expired, which is preferably approximately once every 100 seconds.

In one embodiment of the invention, these measurement modes are activated only if all of the attached UEs are in IDLE mode, and so steps are also taken to avoid entering a measurement mode if a UE is active.

In general, in order to manage the Radio Access Network (RAN) and minimize interference, the basestation 18 dynamically performs radio resource functions in order to minimize the coverage and QOS impacts to the basestations of the macro layer and any surrounding femtobasestations.

Thus, on initial installation, the basestation 18 evaluates both the uplink and downlink and, within bounds set by the management system, selects the carrier with the lowest level of interference and the scrambling codes that are not being used by surrounding femtobasestations. It also detects error conditions (for example a high level of CPICH RSCP) caused by the surrounding macrolayer and/or femtobasestations. If thresholds defined by the management system are exceeded, then the basestation 18 would register a local alarm and report the error condition to the management system. Through the customer care system, certain remedial actions (for example a redeployment of the basestation 18) could be taken to solve the local problem.

In idle periods, the basestation 18 continues to monitor both the uplink and downlink, and build a log of the local environment, for example surrounding macrolayer and/or femtobasestation CPICH RSCP levels, the number of surrounding macrolayer nodeBs and femtobasestations, and carrier/spreading code utilization. The initial selection (within the bounds set by the management system) of maximum Tx power, carrier frequency, spreading codes and number of users would be determined by the log.

In addition, the basestation 18 is able to use measurements made during the first and second measurement modes, in order to detect frequency offsets between the detected signals and the reference frequencies generated by the synthesizers 30, 34, and hence correct any errors in those reference frequencies.

Figure 4:
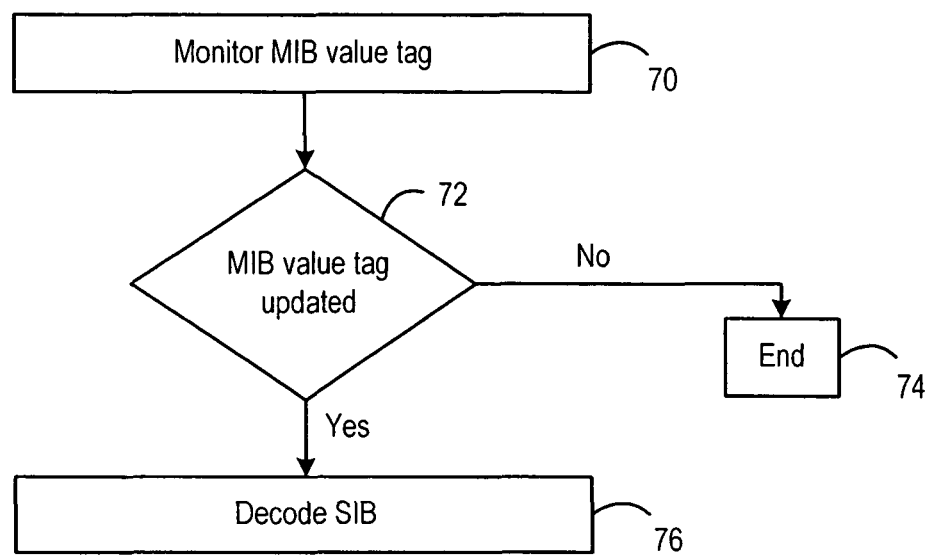
FIG. 4 is a flow chart, illustrating a second method in accordance with the invention.

In the first measurement mode, the basestation 18 can decode the Broadcast Channel (BCH) of transmissions from neighbouring nodeBs, and more specifically can make neighbour cell RF measurements and decode the System Information Blocks (SIBs) from the Broadcast Channel (BCH) of surrounding neighbours, and hence derive key neighbour cell information (e.g. CPICH Tx power, cell loading etc). FIG. 4 illustrates a method for detecting changes in System Information, after one first measurement mode process has previously been activated at power up. The Master Information Block (MIB), which is a 20 ms Transport Block repeated every 80 ms, carries an IE "MIB-ValueTag", which is of type INTEGER 1.8, and which is incremented each time the System Information is updated. Thus, in step 70 of this method, the controller 38 of the basestation 18 monitors the MIB Value tag in the Master Information Block. In step 72, it is determined whether this tag value has been updated since it was last monitored. If not, the process can end at step 74. Only if it is determined at step 72 that the tag value has been updated does the method proceed to step 76, in which the System Information Blocks (SIBs) are refreshed. Specifically, in step 76, the SIBs are decoded and compared against the existing set. This method therefore reduces the time period during which the basestation 18 has to be offline to any attached UEs.

It will be noted that the range of MIB-ValueTag can only encode 8 revisions in System Information. Hence, if we "sample" the MIB periodically, and during that period the System Information has changed 8 times (i.e. MIB-ValueTag has wrapped around), then the update cannot be detected. However, it is assumed that an update of System Information happens rarely (for example on a daily basis) and the MIB sampling rate should be an order of magnitude higher than this.

In normal operation the basestation 18 acts as a WCDMA Node-B femtocell and broadcasts a continuous set of downlink channels to aid UE synchronisation, measurements and system access. However, in the measurement modes, the basestation 18 must provide a subset of UE functionality in order to assess the surrounding radio environment of the macro layer and other femtocell basestations. Specifically, in the measurement modes, the basestation 18 must switch off its downlink transmissions and tune its receiver to various downlink frequencies in order to synchronise and make measurements. The Node-B functionality is then suspended, and UEs can not receive downlink channels from the basestation 18, nor can the basestation 18 receive access attempts or service uplink channels from UEs.

Minimising this disruption is therefore important. The second measurement mode is activated more frequently than the first measurement mode, and so the issue is of particular importance in the second measurement mode. Thus, while the first measurement mode may last for a first duration, the second measurement mode may last for a second duration shorter than the first duration. The result will be that the basestation will be able to gather less data in the second measurement mode than in the first measurement mode.

In the preferred embodiment, the second measurement mode operates by stealing a Down Link frame, of approximately 10 ms duration, by fast switching of the RF receiver approximately every 100 seconds. During this short time period, it is only possible to calculate RF measurements (for example CPICH RSCP and CPICH Ec/Io).

The making of useful measurements in such a short time period can be achieved in different ways. One possibility is to use a non-standards compliant method, utilizing the UE's immunity to short interruptions in the Down Link transmission. Alternatively, application of either the 3GPP Idle Period Down Link (IPDL) or Discontinuous Reception (DRx) can be used in a standards compliant process to capture the required 10 msec Down Link frame of data.

In either case, it is possible to achieve fast tuning of the radio receiver for the purpose of the measurement mode, by using the synthesizer 30 already tuned to the downlink frequency band rather than retuning the uplink frequency synthesizer 34.

Figure 5:
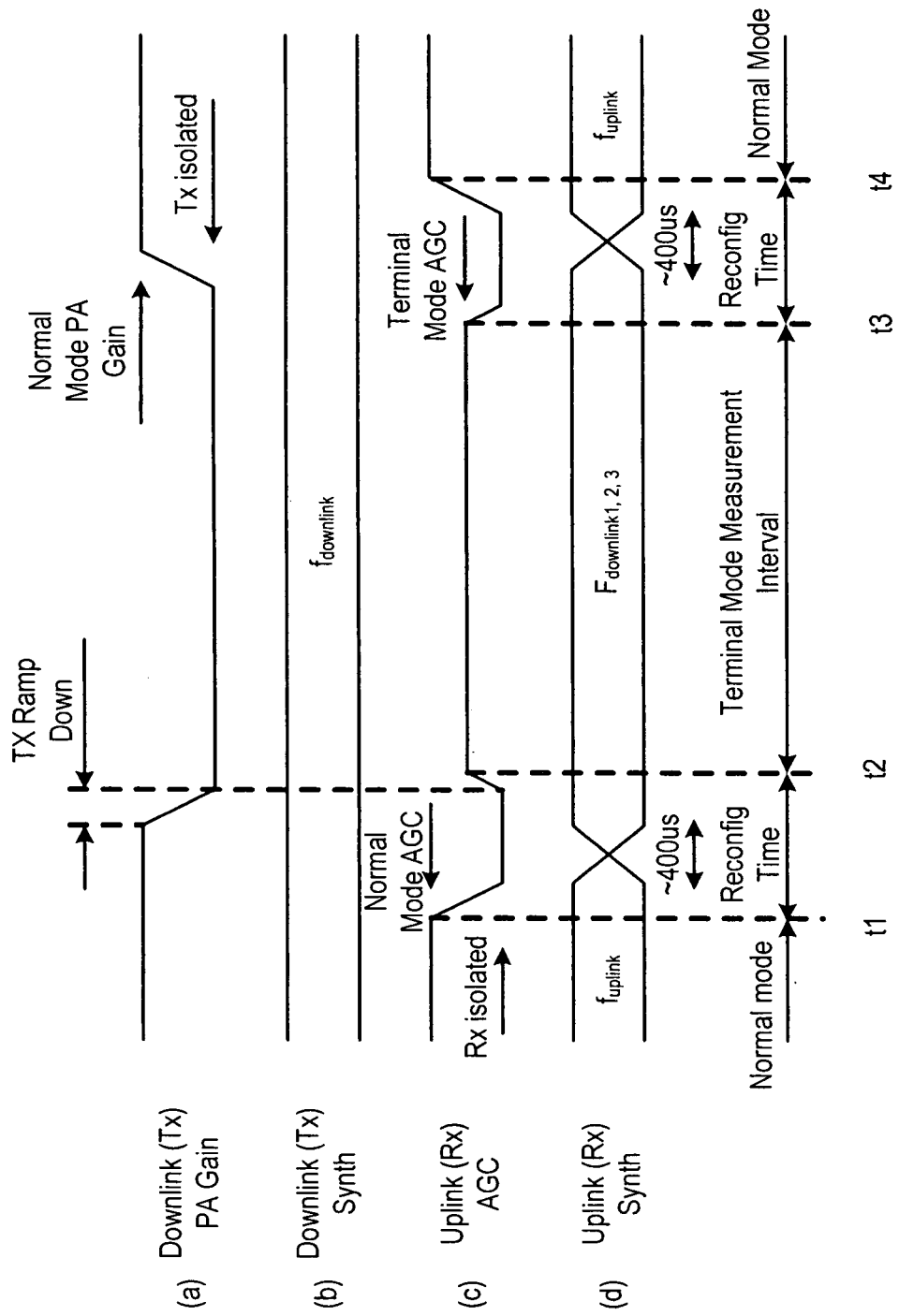
FIG. 5 illustrates the time history of signals in accordance with an aspect of the invention.

FIG. 5 therefore illustrates the operation of the basestation 18 in a time period surrounding a period during which a measurement mode (the second measurement mode in the illustrated case) is activated. Specifically, FIG. 5(a) illustrates the gain of a power amplifier in the TX circuitry 28, FIG. 5(b) illustrates a synthesizer frequency applied to the TX circuitry 28, FIG. 5(c) illustrates an operation of an Automatic Gain Control (AGC) in the RX circuitry 32, and FIG. 5(d) illustrates a synthesizer frequency applied to the RX circuitry 32.

It is advantageous to maximize the time that the measurement mode is available for measurements, while minimizing downlink transmission gaps.

Thus, at time t1, when it is determined that the measurement mode should be activated, the RX circuitry 32 is isolated and the Automatic Gain Control is deactivated, while the position of the switch 36 is altered, so that the downlink frequency $F_{dl}$ is applied to the RX circuitry 32, in order to allow the RX circuitry 32 to detect transmissions from other basestations. When this has been completed, the gain of the power amplifier in the TX circuitry 28 is ramped down and then, at time t2, the measurement mode can be fully activated. Thus, to summarize, the uplink receiver is configured to receive signals at downlink frequencies, and then the downlink transmitter is switched off.

As described above, the RF switch 36 is used to feed the uplink RF chain 32 from the downlink synthesizer 30. This is advantageous because the in-band lock time is much shorter than the out of band lock time and the downlink synthesizer is already operating in the band required for the measurement mode.

At the end of the measurement period, at time t3, the Automatic Gain Control is deactivated, and the downlink transmitter is reactivated, and then the position of the switch 36 is altered back to its normal operating position, so that the uplink frequency $F_{ul}$ is again applied to the RX circuitry 32, in order to allow the RX circuitry 32 to detect transmissions from UEs. When this has been completed, the Automatic Gain Control of the RX circuitry 32 is reactivated, allowing the normal operating mode to resume.

Further steps can be taken to allow the basestation 18 to enter a measurement mode without severe loss of performance. At its simplest, this means that the measurement mode should be implemented in a manner which mimics short, deep fades, as can often be experienced as a regular feature of the radio environment. Fading is expected, and WCDMA terminals are designed to be resilient to this and so, in this case, it is likely that no overall system degradation will occur.

Conventional WCDMA systems can operate on the basis of an Idle Period Downlink (IPDL), inserting pseudo-random transmission gaps in the downlink. These can be used for a measurement mode. The basis is that the NodeB can insert transmission gaps in the downlink which can be used by attached UEs to gain better visibility of neighbouring cells (the theory being that the serving cell interference is removed in these idle period gaps, and hence the SIR of the neighbours is increased). IPDL is a parameterised system similar to compressed mode, where the definition, creation and deletion of the idle period gaps are controlled by UTRA RRC.

Unlike compressed mode, IPDL does not attempt to reschedule any symbols which are dropped due to the insertion of the transmission gaps. Error correction, if required, is left to the FEC (or RLC/MAC) processes.

Figure 6:
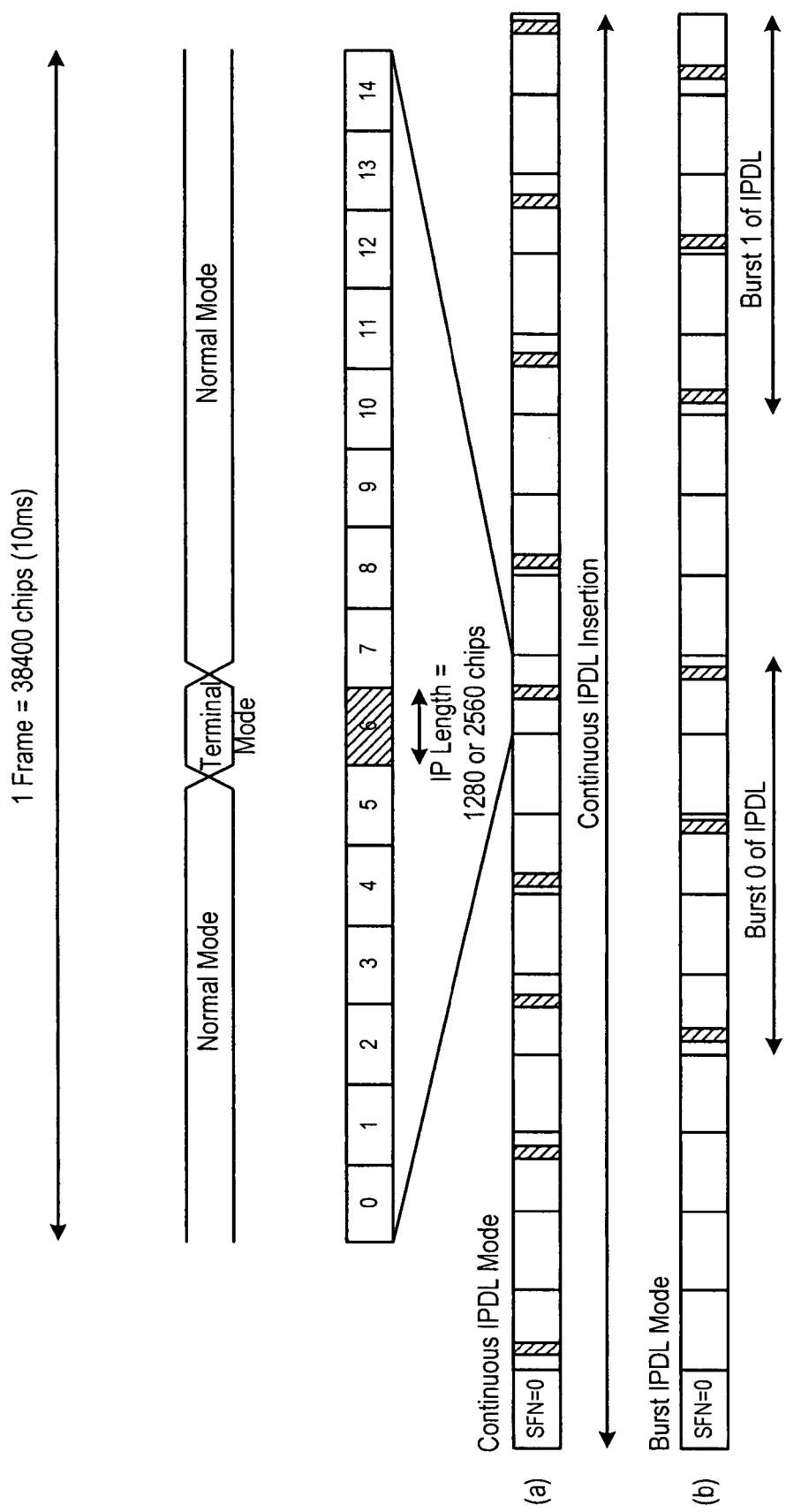
FIG. 6 illustrates the time history of signals in accordance with another aspect of the invention.

FIG. 6 illustrates the operation of IPDL. Specifically, FIG. 6(a) shows the operation of Continuous Mode, where gaps are inserted all the time, while FIG. 6(b) shows the operation of Burst Mode, where gaps are inserted periodically.

In either case, during some frames, there is an Idle Period and, in accordance with the invention, the measurement mode (or "terminal mode", where the basestation 18 operates as a terminal, receiving transmissions from other basestations) can be activated during the Idle Periods. This has the advantage that the basestation 18 can inform attached UEs of the IPDL patterns, and can then schedule measurement mode activities coincident with these gaps. This mechanism could effectively mask downlink transmission gaps from attached UE in a legitimate manner.

The gaps (Idle Periods) generated by IPDL are relatively short, either 1280 or 2560 chips (½ slot or 1 slot), and it is assumed that P-CCPCH reception will be impossible in this mode. However, this will allow enough samples to be collected for a CPICH RSCP and CPICH EC/Ior measurement over a number of IPDL gaps. As described in more detail above, the basestation 18 needs to swap its RF configuration by: switching off the downlink stage, switching the uplink synthesizer to the required downlink frequency, programming the required downlink AGC setting, and waiting for synthesizer lock. After the measurements have been made, a similar reverse procedure must be performed to revert to the normal operating mode.

In an alternative embodiment, the measurement mode capitalizes on the fact the vast majority of the UEs (phones, PDAs, etc.) are typically battery powered devices. The designers of the UEs therefore attempt to keep the RF, baseband and processing subsystems in a sleep (low power) state for as long as possible to conserve battery power and prolong standby times. Even though 3GPP WCDMA defines a continuous downlink, specifically for the P-CPICH (Primary Common Pilot Channel) and the SCH (Synchronization Channel) channels, practical UE receivers are discontinuous (at least in idle mode).

The 3GPP specification makes provision for this, by defining the Paging Indicator Channel (PICH) and a Discontinuous Reception (DRX) Cycle. The DRX Cycle is a mechanism which requires the UE to receive only a subset of the available paging occasions from the serving cell, and thus allows the UE to enter a standby (low power) state rather than constantly monitoring the entire downlink S-CCPCH. The PICH is a downlink indicator channel available in the UE which contains Paging Indicators (PIs). Its purpose is to indicate whether a paging message is scheduled for a group of attached UEs on the S-CCPCH. By receiving and demodulating the (short) PI the UE can avoid having to fully wake to receive and demodulate the entire associated S-SCPCH unless indicated.

Portable UEs will typically have a low power state (standby) where high drain subsystems in the RF and baseband processing are suspended or powered off, and processing cores are run at a reduced clock speed (i.e. from a 32 kHz reference). The PICH and DRX Cycle are mechanisms that allow UEs to enter this standby state more frequently.

Figure 7:
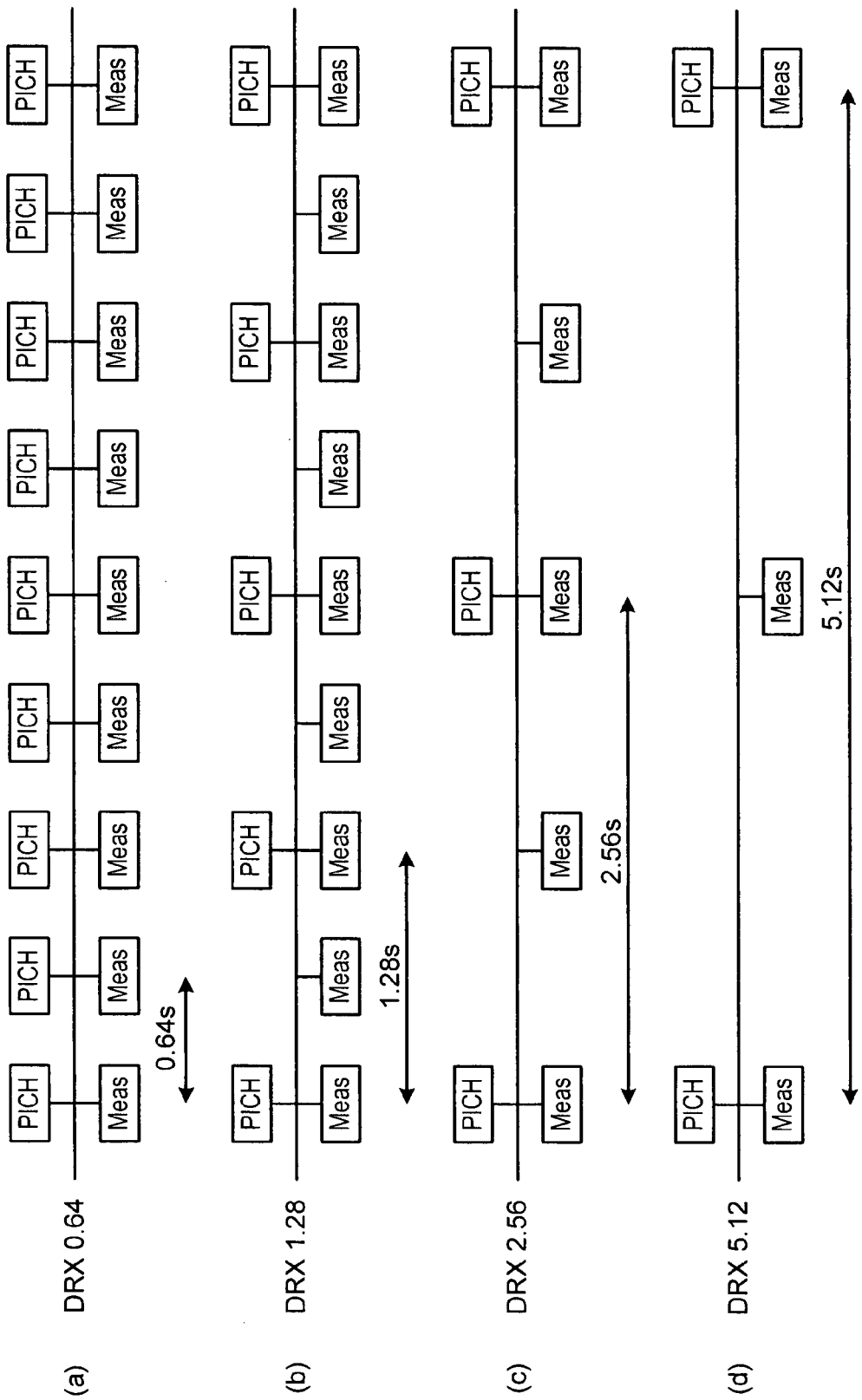
FIG. 7 illustrates the time history of signals in accordance with a further aspect of the invention.

FIG. 7 is a schematic diagram, illustrating four possible DRX modes. As shown in FIG. 7(a), in DRX0.64 mode, there is a PICH channel transmission every 640 ms and there is a measurement opportunity every 640 ms; as shown in FIG. 7(b), in DRX1.28 mode, there is a PICH channel transmission every 1.28 s and there is a measurement opportunity every 640 ms; as shown in FIG. 7(c), in DRX2.56 mode, there is a PICH channel transmission every 2.56 s and there is a measurement opportunity every 1.28 s; as shown in FIG. 7(d), in DRX5.12 mode, there is a PICH channel transmission every 5.12 s and there is a measurement opportunity every 2.56 s.

It is again assumed that portable UEs will conform to this minimum specification to conserve battery power.

Then, the basestation 18 can advantageously schedule its measurement modes so that they do not coincide with the PICH and UE measurement occasions, in order to reduce the likelihood of disturbing any UEs.

Figure 8:
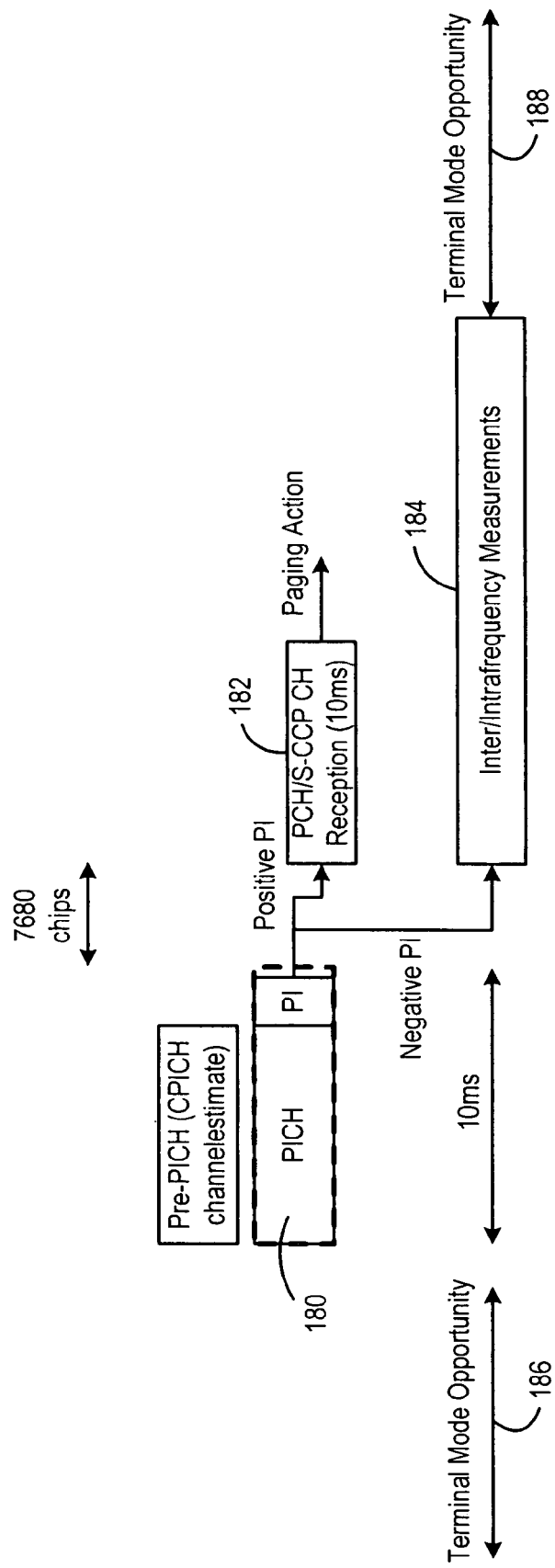
FIG. 8 illustrates the time history of signals in accordance with a further aspect of the invention.

FIG. 8 shows the relative timings of the PICH channel transmissions and the measurement opportunities in each case. That is, for each PICH transmission 180, the UE makes a determination as to whether it needs to detect a paging message. If so, the UE then receives the signal on the paging channel 182. If not, the UE is expected to make measurements 184 on the serving cell (i.e. the basestation 18, in the case of a UE attached to the basestation) and the neighbouring cells (i.e. other femtocell basestations or macrolayer network basestations).

In either case, this defines time periods 186, 188 between the PICH channel transmissions and the measurement opportunities, in which the basestation 18 can enter a measurement mode with a lower probability of disturbing a UE.

There are thus described methods for allowing a basestation to make measurements of signals transmitted from other basestations, in order to be able to adapt its configuration based on the surrounding radio environment.

Figure 9:
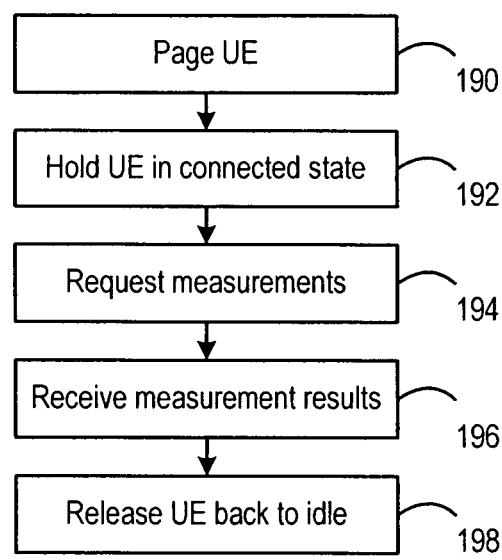
FIG. 9 is a flow chart, illustrating a further method in accordance with the invention.

In another embodiment of the invention, the basestation obtains information from an attached UE, which is itself able to make measurements on signals from surrounding basestations. FIG. 9 is a flow chart, showing a method in accordance with this aspect of the invention. Conventionally, a UE is able to take measurements from surrounding neighbour basestations, and report the measurement results to the serving basestation (for example the basestation 18 in the case of a UE that is within the coverage area of the basestation 18), while the while that UE is in call.

As shown in FIG. 9, the basestation 18 is able to put an attached UE into a state in which it can report measurement results without ever being in call.

Thus, in step 190, the basestation 18 pages the attached UE while it is in idle mode and then, in step 192, holds it in an RRC connected state, without any interaction in the Mobility Management (MM) protocol; that is, without actually establishing a call that would allow any data transfer.

In step 194, the basestation 18 requests measurement results from the UE. For example, these measurements can be measurements made by the UE based on signals transmitted by neighbour basestations. More specifically, the measurements can for example relate to the signal strengths of the transmissions from such neighbour basestations or can relate to the timings of transmissions from the neighbour basestations relative to the timings of transmissions from the basestation 18.

In step 196, the basestation 18 receives the requested measurement results from the UE, and these can be used by the basestation 18, for example for monitoring the surrounding radio environment in order to be sure that its transmissions do not cause undue interference (and are not subject to undue interference), or for adjusting the timings of transmissions from the basestation 18.

The invention claimed is:

1. A basestation configured to provide coverage over a small area, for use in a cellular wireless communications network, the network having at least one downlink transmit frequency and at least one uplink transmit frequency,
wherein at least one mobile device in the cellular wireless communications network is configured such that it is capable of being wirelessly connected to the basestation,
wherein the basestation is adapted to receive signals from another basestation in said network on the downlink transmit frequency during periods when the at least one mobile device having a wireless connection to the basestation is not making measurements,
wherein the basestation is adapted to receive the signals from the other basestation at predetermined time intervals,
wherein, at said predetermined time intervals, the basestation is adapted to receive the signals from the other basestation for a period short enough that downlink transmission gaps for the at least one mobile device are minimized, and
wherein a same receiver circuitry of the basestation is used to receive signals from the other basestation and from the at least one mobile device wirelessly connected to the basestation.

2. A basestation as claimed in claim 1, comprising:
radio frequency transmit circuitry;
radio frequency receive circuitry;
a first synthesizer, for generating said downlink transmit frequency, and supplying a first synthesizer signal to said radio frequency transmit circuitry;
a second synthesizer, for generating said uplink transmit frequency, and supplying a second synthesizer signal to said radio frequency receive circuitry; and
a switch, for connecting said first synthesizer to said radio frequency receive circuitry to supply the first synthesizer signal thereto, when the basestation is receiving signals from the other basestation.

3. A basestation as claimed in claim 2, wherein the basestation is adapted periodically to control said switch to connect said first synthesizer to said radio frequency receive circuitry to supply the first synthesizer signal thereto, during time periods when all mobile devices attached to the basestation are in their idle modes.

4. A basestation as claimed in claim 1, wherein the basestation is adapted to receive first signals from at least one other basestation at first time intervals, and to receive second signals from at least one other basestation at second time intervals, wherein the second time intervals are shorter than the first time intervals.

5. A basestation as claimed in claim 4, wherein, at said first time intervals, the basestation is adapted to decode System Information Blocks from the Broadcast Channel of the or each other basestation.

6. A basestation as claimed in claim 4 or 5, wherein, at said first time intervals, the basestation is adapted to decode a tag in a Master Information Block from the Broadcast Channel of the or each other basestation, and to decode the System Information Blocks only if said tag value indicates that information in said System Information Blocks has changed.

7. A basestation as claimed in claim 4, wherein, at said second time intervals, the basestation is adapted to receive signals from the other basestation for a period of one downlink frame.

8. A basestation as claimed in claim 7, wherein, at said second time intervals, the basestation is adapted to take measurements on a Common Pilot Channel of the or each other basestation.

9. A basestation as claimed in any of claim 1-5, 7 or 8, wherein the basestation is adapted to receive signals from the other basestation in said network on said downlink transmit frequency during Idle Period Downlink transmission gaps.

10. A method of operating a basestation configured to provide coverage over a small area in a cellular wireless communications network, the network having at least one downlink transmit frequency and at least one uplink transmit frequency, and at least one mobile device configured such that it is capable of being wirelessly connected to the basestation, the method comprising configuring the basestation to:
receive signals from another basestation in said network on said downlink transmit frequency during periods when the at least one mobile device having a wireless connection to the basestation is not making measurements;
receive signals from the other basestation at predetermined time intervals; and
at said predetermined time intervals, receive signals from the other basestation for a period short enough that downlink transmission gaps for the at least one mobile device are minimized, and
wherein a same receiver circuitry of the basestation is used to receive signals from the other basestation and from the at least one mobile device wirelessly connected to the basestation.

* * * * *